(12) United States Patent
Sasaki et al.

(10) Patent No.: US 7,114,391 B2
(45) Date of Patent: Oct. 3, 2006

(54) LIQUID LEVEL DETECTION APPARATUS

(75) Inventors: Hisashi Sasaki, Aichi (JP); Masayuki Motomura, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 59 days.

(21) Appl. No.: 11/016,887

(22) Filed: Dec. 21, 2004

(65) Prior Publication Data

US 2005/0156962 A1    Jul. 21, 2005

(30) Foreign Application Priority Data

Dec. 26, 2003  (JP)  ............................. 2003-434195

(51) Int. Cl.
*G01F 23/26*   (2006.01)
(52) U.S. Cl. .................................. 73/304 C
(58) Field of Classification Search .............. 73/304 C, 73/290 R
See application file for complete search history.

(56) References Cited

U.S. PATENT DOCUMENTS

| | | | |
|---|---|---|---|
| 3,755,804 A * | 8/1973 | Johnson | 340/607 |
| 4,806,847 A * | 2/1989 | Atherton et al. | 73/304 C |
| 4,820,973 A | 4/1989 | Alvarez | |
| 6,564,630 B1 | 5/2003 | Klemp | |
| 7,021,122 B1 * | 4/2006 | Rosemberg et al. | 73/54.01 |

FOREIGN PATENT DOCUMENTS

| | | |
|---|---|---|
| DE | 196 44 777 C1 | 6/1998 |
| JP | 63-079016 A | 4/1988 |
| JP | 2003-110364 A | 4/2003 |
| WO | WO 01/79789 A2 | 10/2001 |

* cited by examiner

*Primary Examiner*—Hezron Williams
*Assistant Examiner*—Rodney Frank
(74) *Attorney, Agent, or Firm*—Sughrue Mion, PLLC

(57) ABSTRACT

There is provided a liquid level detection apparatus for detecting the level of a liquid, including a pair of first electrodes, a pair of second electrodes arranged at a different height to that of the first electrodes, a pair of electrode leads having respective ends connected with the first electrodes and sandwiching therebetween the second electrodes, a grounding unit that changes, between a current-carrying state and an open state, a second electrode current bypass from the second electrodes to a ground line, a first electrode capacitance measurement unit that measures a first electrode capacitance between the first electrodes, with the second electrode current bypass set in the current-carrying state to establish a connection from the second electrodes to the ground line, and a level determination unit that determines the liquid level based on the first electrode capacitance between the first electrodes and a second electrode capacitance between the second electrodes.

17 Claims, 13 Drawing Sheets

LIQUID LEVEL DETECTION APPARATUS

BACKGROUND OF THE INVENTION

The present invention relates to a liquid level detection apparatus that has a pair of first electrodes and a pair of second electrodes to detect the level of a liquid in a container based on a capacitance between the first electrodes and a capacitance between the second electrodes.

It is known that a pair of electrodes develops a capacitance therebetween depending on the permittivity of a material around the electrodes. In view of such a known fact, there has been proposed a liquid level detection apparatus having a pair of electrodes to detect the level of a liquid based on a capacitance developed between the electrodes. Japanese Laid-Open Patent Publication No. 63-079016 discloses a liquid level detection apparatus of the proposed type, having a sensor that includes a pair of linear sensor electrodes, a pair of linear reference electrodes and a printed circuit board insulatively supporting thereon the sensor and reference electrodes. The sensor and reference electrodes are arranged at different height positions such that the whole of the reference electrodes and at least parts of the sensor electrodes are immersed in a test liquid. In this state, the liquid level detection apparatus measures a capacitance between the sensor electrodes and a capacitance between the reference electrodes, calculates a permittivity of the test liquid from the reference electrode capacitance, and then, determines a level of the test liquid based on the sensor electrode capacitance and the test liquid permittivity.

SUMMARY OF THE INVENTION

The sensor has electrode leads connecting the electrodes to an external device. As the sensor electrodes are sandwiched between the reference electrode leads in the above-proposed liquid level detection apparatus, there are cases where a stray capacitance occurs between the reference electrode leads and becomes superimposed on the reference electrode capacitance. The reference electrode capacitance cannot be measured accurately, thereby introducing an error into the measured permittivity value of the test liquid. This results in a deterioration of liquid level detection accuracy.

In order to not only prevent the occurrence of a stray capacitance between the electrode leads but also prevent the occurrence of a stray capacitance between the sensor electrodes and the reference electrodes, the sensor of the above-proposed liquid level detection apparatus includes a ground electrode extending between the sensor electrode and the reference electrode lead and between the sensor electrode and the reference electrode. However, the arrangement of such an additional electrode causes upsizing of the sensor body so that it is necessary to secure a larger sensor installation space. If the sensor installation space is limited, there is no other choice but to provide no ground electrode between the electrode leads for downsizing of the sensor. In this case, the detection accuracy of the liquid level detection apparatus becomes unavoidably deteriorated under the adverse effect of a stray capacitance between the electrode leads.

It is therefore an object of the present invention to provide a liquid level detection apparatus that has a pair of first electrodes, a pair of second electrodes and a pair of electrode leads connected with the first electrodes and sandwiching therebetween the second electrodes, in which the occurrence of a stray capacitance between the electrode leads can be prevented to avoid a deterioration of detection accuracy without an increase in electrode arrangement area.

According to one aspect of the present invention, there is provided an apparatus for detecting the level of a liquid, comprising: a pair of first electrodes at least partly immersed in the liquid; a pair of second electrodes arranged at a different height to that of the first electrodes and at least partly immersed in the liquid; a pair of electrode leads having respective ends connected with the first electrodes and sandwiching therebetween the second electrodes; a grounding unit that changes, between a current-carrying state and an open state, a second electrode current bypass from the second electrodes to a ground line; a first electrode capacitance measurement unit that measures a first electrode capacitance between the first electrodes, with the second electrode current bypass set in the current-carrying state to establish a connection from the second electrodes to the ground line; and a level determination unit that determines the liquid level based on the first electrode capacitance between the first electrodes and a second electrode capacitance between the second electrodes.

According to another aspect of the present invention, there is provided an apparatus for detecting the level of a liquid in a container, comprising: a sensor mounted onto the container, the sensor including a pair of first electrodes immersed in the liquid to develop a first electrode capacitance, a pair of second electrodes vertically aligned to the first electrodes and immersed in the liquid to develop a second electrode capacitance, a pair of first electrode leads connected with the respective first electrodes and sandwiching therebetween the second electrodes and a pair of second electrode leads connected with the respective second electrodes; and a detection circuit module electrically connected with the first and second electrodes through the electrode leads, the circuit module including a grounding circuit for establishing and breaking a connection from the second electrodes to a ground line and a microcomputer configured to control the grounding circuit so as to connect the second electrodes with the ground line at the time of measurement of the first electrode capacitance, control the grounding circuit so as to insulate the second electrodes from the ground line at the time of measurement of the second electrode capacitance and determine the liquid level based on the first and second electrode capacitances.

The other objects and features of the invention will also become understood from the following description.

DESCRIPTION OF THE EMBODIMENTS

Figure 1:
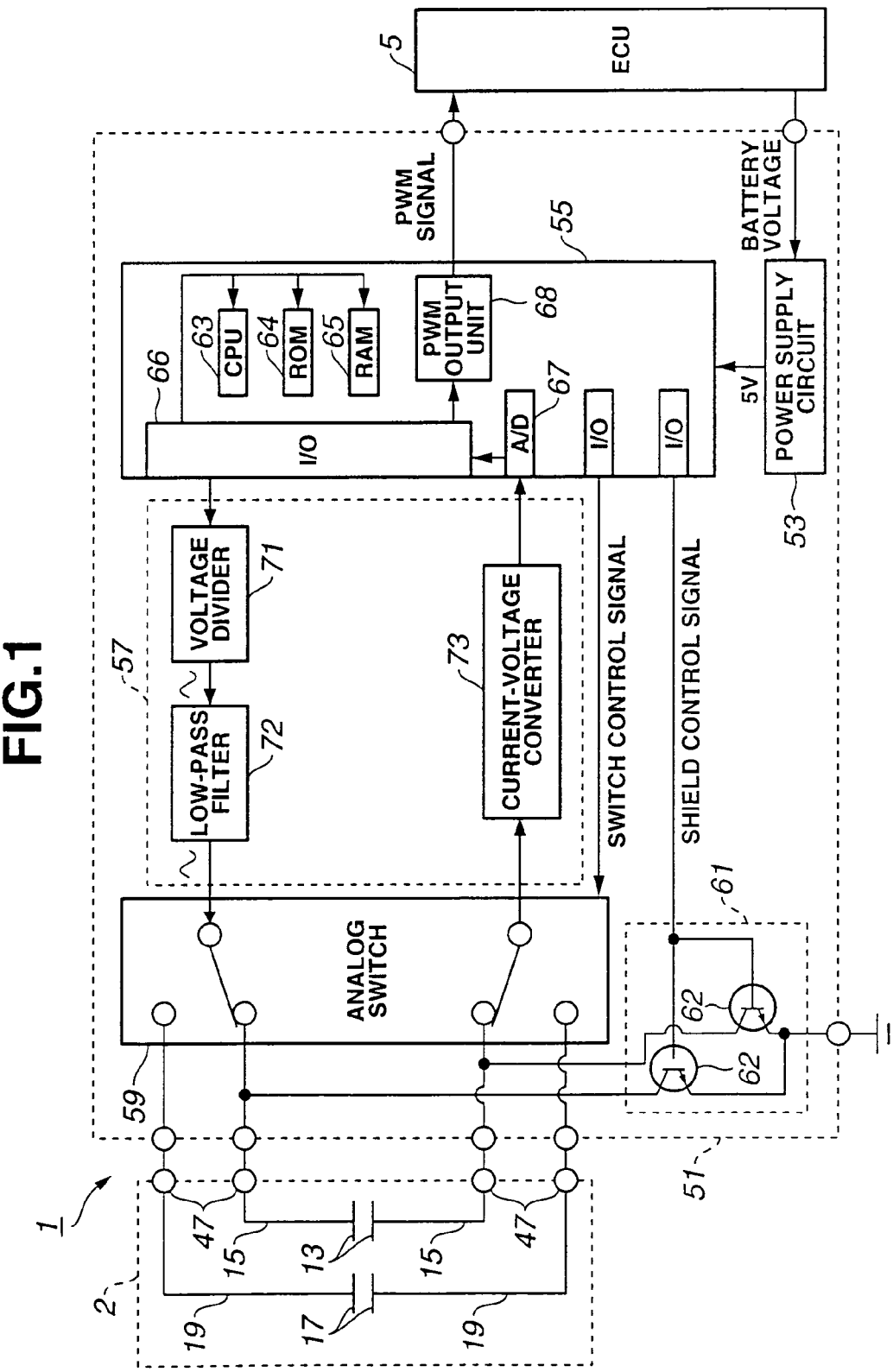
FIG. 1 is a block diagram of a liquid level detection apparatus according to a first embodiment of the present invention.

The present invention will be described by way of first and second embodiments, in which like parts and portions are designated by like reference numerals. In the following description, the terms "front" and "rear" are used with respect to the insertion direction of a liquid level sensor of a liquid level detection apparatus into a liquid container.

An explanation of the first embodiment will be given explained below with reference to FIGS. 1 to 11. The first embodiment specifically refers to an oil level detection apparatus 1 that detects the oil level (liquid level) of an oil tank (container) disposed in an internal combustion engine, and the oil level varies with the amount of oil stored in the tank.

Referring to FIG. 1, the oil level detection apparatus 1 has an oil level sensor 2 and a detection circuit module 51 electrically connected with the oil level sensor 51. In the first embodiment, the oil level detection apparatus 1 is linked to an electronic control unit (ECU) 5 to send information about the detected oil level to the ECU 5. The ECU 5 is configured to control the overall operations of the internal combustion engine through various control processes including an alarming process to generate an alarm indicating an oil level anomaly when the detected oil level deviates from a normal range, an ignition timing control process to control the ignition timing of the engine and a knock detection process to detect the occurrence of abnormal combustion, such as knocking, in the engine.

Figure 2:
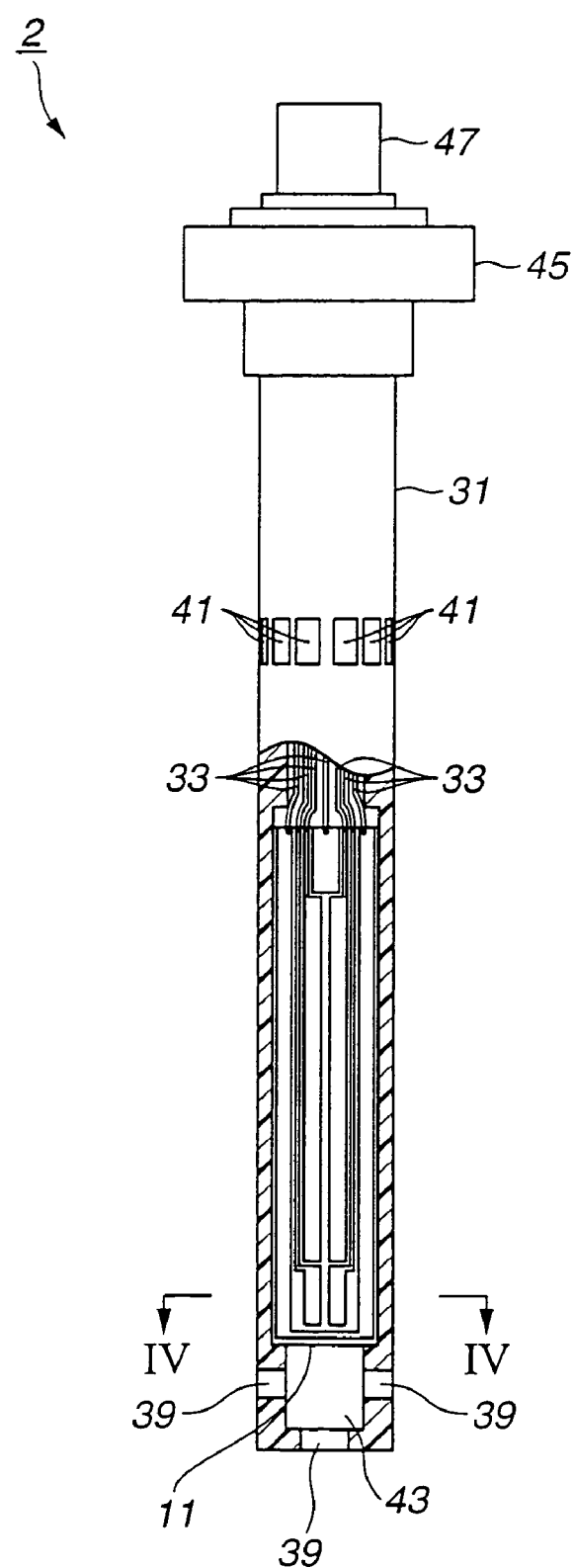
FIG. 2 is a partially sectional view of part of a liquid level sensor of the liquid level detection apparatus according to the first embodiment of the present invention.

As shown in FIG. 2, the oil level sensor 2 has a sensor body 11, a casing 31 installing therein the sensor body 11 to place the sensor body in position, and metal lead electrodes 33 for electrical connections of the sensor body 11 to the circuit module 51 and to a ground line. To mount the oil level sensor 2 onto the oil tank, the oil level sensor 2 is inserted into the oil tank from the vertically upper side (tank top side) to the vertically lower side (tank bottom side).

Figure 3:
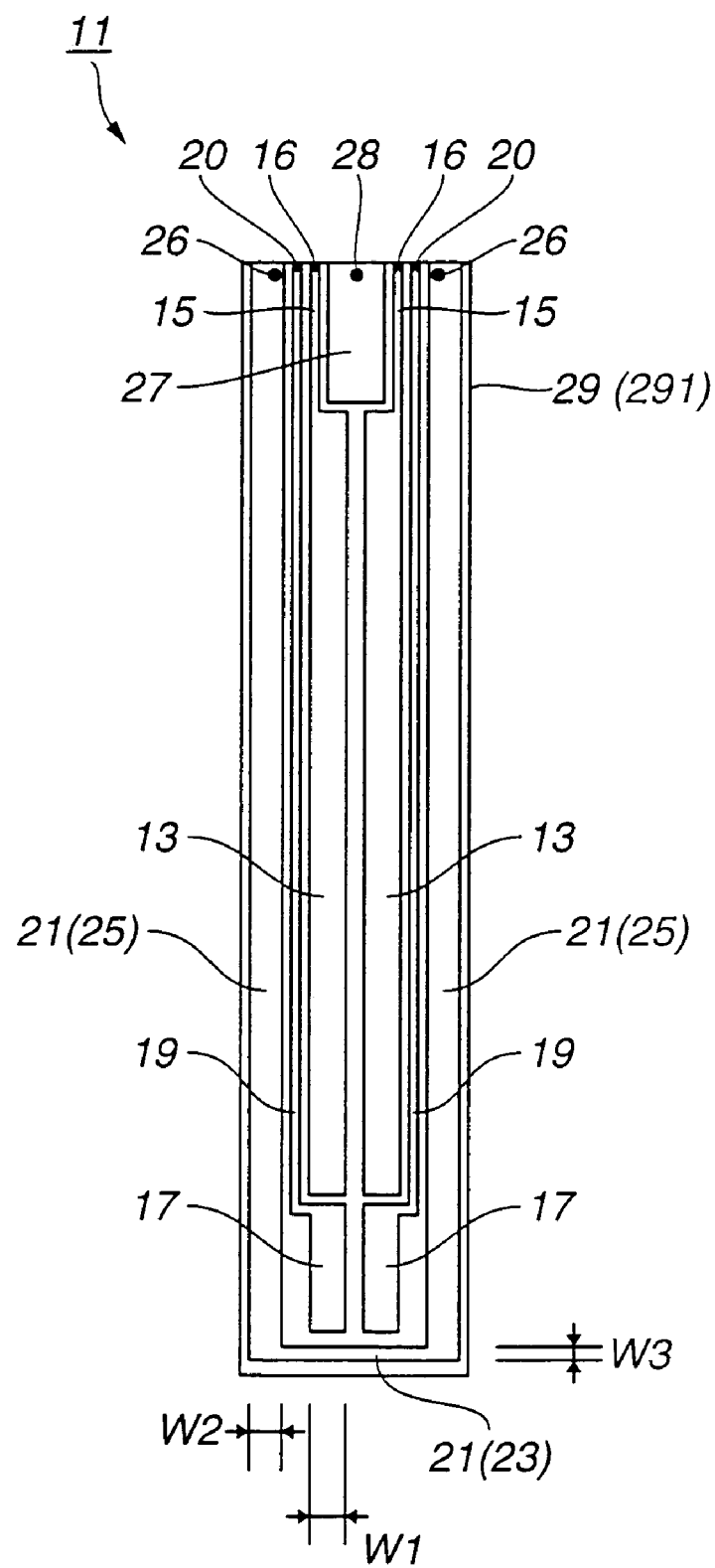
FIG. 3 is an arrangement view of sensor elements in the liquid level sensor according to the first embodiment of the present invention.
Figure 4:
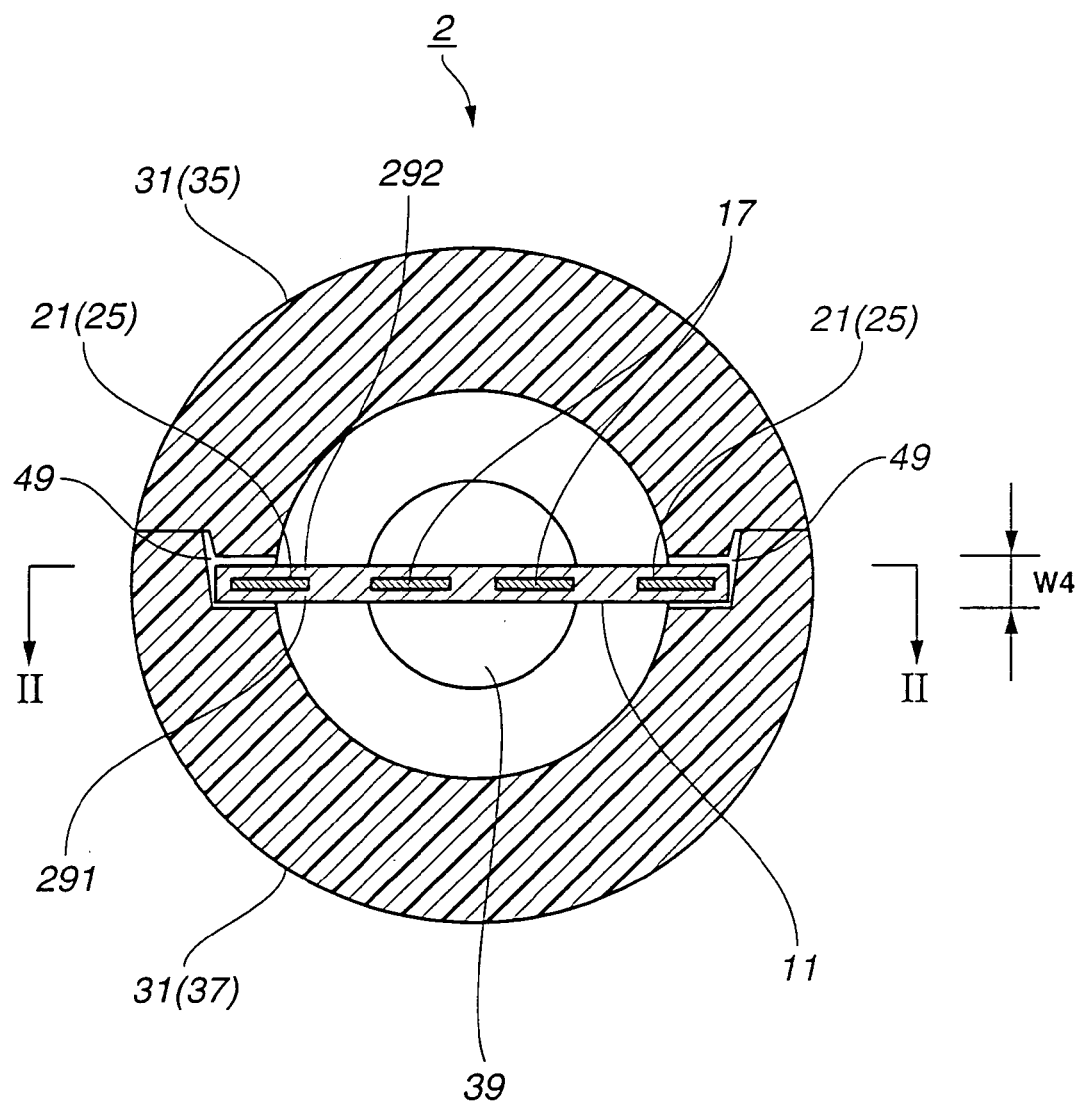
FIG. 4 is a sectional view of the liquid level sensor, when taken along a line IV—IV of FIG. 2, according to the first embodiment of the present invention.

The sensor body 11 has a rectangular film 29 of flexible insulating material, such as polyimide, various electrodes including a pair of sensor electrodes 13 (as second electrodes), a pair of reference electrodes 17 (as first electrodes) and a ground electrode 27 each made of metal foil, such as copper foil, and embedded in the film 29, a pair of electrode leads 15 connected with the respective rear ends of the sensor electrodes 13, a pair of electrode leads 19 connected with the respective rear ends of the reference electrodes 17 to sandwich therebetween the sensor electrodes 13, and a reinforcement 21 made of metal foil, such as copper foil, and embedded in the film 29 as shown in FIGS. 3 and 4.

The film 29 has thin insulating layers 291 and 292 between which the electrodes 13, 17 and 27, the electrode leads 15 and 19 and the reinforcement 21 are formed, as shown in FIG. 4, such that the film 29 functions as an electrically insulating support that supports the electrodes 13, 17 and 27 and the electrode leads 15 and 19 in the same plane i.e. on the insulating layer 291 while securing corrosion resistance of the electrodes 13, 17 and 27 and the electrode leads 15 and 19.

The sensor electrodes 13 are vertically elongated and arranged in parallel with each other along the longitudinal direction of the film 29, so that at least parts of the sensor electrodes 13 are immersed in the oil. The parallel arrangement of the sensor electrodes 13 allows the sensor electrodes 13 to develop a capacitance therebetween depending on the permittivity of a material around the electrodes 13. According to such electrode characteristics, the capacitance between the sensor electrodes 13 (hereinafter occasionally referred to as a "sensor electrode capacitance") varies with the rate of the length of the immersed parts of the sensor electrodes 13 to the entire longitudinal length of the sensor electrodes 13 (hereinafter occasionally referred to as a "sensor electrode immersion rate"). The oil level detection apparatus 1 is thus capable of detecting the oil level upon determination of the sensor electrode immersion rate based on the sensor electrode capacitance.

The reference electrodes 17 are also vertically elongated, but shorter in length than the sensor electrodes 13, and arranged in parallel with each other along the longitudinal direction of the film 19 at a different height to that of the sensor electrodes 13. As in the case of the sensor electrodes 13, the parallel arrangement of the reference electrodes 17 allows the reference electrodes 17 to develop a capacitance therebetween depending on the permittivity of a material around the electrodes 17. The reference electrodes 17 are vertically aligned to the sensor electrodes 13 and located on the front side (i.e. the vertically lower side) of the sensor electrodes 13 so that the whole of the reference electrodes 17 are kept immersed in the oil at all times. Accordingly, the capacitance between the reference electrodes 17 (hereinafter referred to as a "reference electrode capacitance") depends only on the permittivity of the oil. When the oil has deteriorated or another kind of oil is added into the tank, the oil permittivity varies even at the same oil level. It is very likely that the detection of the oil level based only on the sensor electrode capacitance will cause a detection error. By contrast, the oil level detection apparatus 1 detects the oil level based on both of the sensor electrode capacitance and the reference electrode capacitance. This makes it possible to detect the oil level properly without being influenced by such a variation in the oil permittivity.

The electrode leads 15 and 19 extend from the rear ends of the electrodes 13 and 17 toward the rear end of the film 29 and have connection terminals 16 and 20 at rear ends thereof, respectively. When the sensor body 11 is installed in the casing 31, the terminals 16 and 20 are connected with the lead electrodes 33 to thereby establish electric connections of the electrodes 13 and 17 to the circuit module 51.

The ground electrode 27 is arranged on the rear side (i.e. the vertically upper side) of the sensor electrodes 13 between the electrode leads 15 and has a ground terminal 28 at a rear end thereof. When the sensor body 11 is installed in the casing 31, the ground terminal 28 is connected with the lead electrode 33 to thereby establish an electric connection of the electrode 27 to the ground line. It becomes very unlikely that there will arise a change in capacitance between the electrode leads 15 under the condition that the ground electrode 27 is connected to the ground line. This makes it possible to prevent the capacitance between the electrode leads 15 from causing an adverse effect as a stray capacitance.

The reinforcement 21 includes a pair of parallel reinforcing portions 25 and an orthogonal reinforcing portion 23 as shown in FIG. 3. The reinforcing portions 25 are arranged in parallel with each other along the longitudinal direction of the sensor electrodes 13 (i.e. the longitudinal length direction of the film 29) at a location radially outwardly of the sensor body 11 with respect to the electrodes 13, 17 and 27 so as to sandwich therebetween the sensor electrodes 13, the reference electrodes 17 and the reference electrode leads 15 and 19. The reinforcing portion 23 is arranged on the front side of the reference electrodes 17 orthogonally (i.e. in a width direction of the film 29) so as to extend between front ends of the reinforcing portions 25. The reinforcement 21 has ground terminals 26 at respective rear ends of the reinforcing portions 25. The ground terminals 26 are connected with the lead electrodes 33 when the sensor body 11 is installed in the casing 31, to establish electric connections of the reinforcement 21 to the ground line. With a proper ground established for the reinforcement 21, the sensor and reference electrode capacitances can be prevented from being affected by a parasitic capacitance on the casing 31.

In the first embodiment, each of the sensor electrodes 13 and the reference electrodes 17 has a thickness of 12 μm and a width (W1) of 2.0 mm in the first embodiment. Each of the reinforcing portions 25 has a thickness of 50 μm and a width (W2) of 2.2 mm, and the reinforcing portion 23 has a thickness of 50 μm and a width (W3) of 1.0 mm, in the first embodiment. However, the dimensions of the electrodes 13 and 17 and the reinforcement 21 are not limited to the above and can be selected appropriately in accordance with the various conditions including a detection target and sensor surroundings.

The casing 31 includes a pair of semicylindrical casing members 35 and 37 as shown in FIGS. 2 and 4. It is noted that FIGS. 2 and 4 are sectional views of the oil level sensor 2 when taken along a II—II line of FIG. 4 and a IV—IV line of FIG. 2, respectively. The casing members 35 and 37 are made of an insulating synthetic resin, such as nylon 6.6, and joined together so that the casing 31 has a substantially axially-long cylindrical shape to define an internal space 43 for installing the sensor body 11. Through holes 39 and 41 are formed in front and axially middle portions of the casing 31, respectively. The internal space 43 communicates with the outside through the holes 39 and 41 to allow the migration of ambient materials (such as oil and air) between the internal space 43 and the outside. Further, the casing 31 has a flange 45 and a connector 47 formed on a rear end portion thereof. The flange 45 extends radially outwardly of the casing 31 and comes into contact with the outer surface of the oil tank, upon mounting of the oil level sensor 2 onto the oil tank, to set the orientation and position of the oil level sensor 2 within the oil tank. The connector 47 includes a mount shaped engageably with the connector of an external device and metal terminals electrically connected with the respective lead electrodes 33 to provide a current path from each electrode 13, 17 of the sensor body 11 to the circuit module 51.

As shown in FIG. 4, two positioning slits 49 are formed between the casing members 35 and 37 in such a manner that the width (W4) of the slits 49 is larger than the thickness of the sensor body 11. By fitting of the width ends of the sensor body 11 into the respective slits 49, the sensor body 11 is placed in position within the internal space 43 of the casing 31. It is particularly preferable to arrange at least parts of the reinforcing portions 25 in the slits 49 such that the sensor body 11 is held in the slits 49 with such high-strength (less-deformable) reinforced parts. This makes it possible to prevent the sensor body 11 from becoming bent and tilted and to avoid the sensor body 11 from coming out of the positioning slits 49.

When the oil level sensor 2 is mounted onto the oil tank, a certain amount of oil enters into the internal space of the sensor body 11 in accordance with the oil level. The rate of immersion of the sensor body 11, more specifically the sensor electrodes 13, into the oil varies with the oil level so that the sensor electrode capacitance indicates a sensor value responsive to the oil level. On the other hand, the reference electrodes 17 are totally kept immersed in the oil so that the reference electrode capacitance of the sensor body 11 indicates a reference value responsive to the oil permittivity.

Referring again to FIG. 1, the circuit module 51 has a power supply circuit 53, a microcomputer 55, a signal transmit/receive circuit (unit) 57, a switching circuit (unit) 59 and a grounding circuit (unit) 61.

The power supply circuit 51 receives power from the ECU 5, removes high-frequency components from the waveform of the received power, and then, supply power (e.g. a voltage of 5 V) to all other components of the circuit module 51.

The microcomputer 55 includes a known set of CPU 63, ROM 64, RAM 65, I/O port 66, A/D conversion port 67 and a timer register so as to determine the oil level based on the sensor electrode capacitance and the reference electrode capacitance by the after-mentioned oil level detection process. The microcomputer 55 further includes a PWM (pulse-width modulation) output unit 68 to output, to the ECU 5, a PWM signal containing information about the detected oil level.

The signal transmit/receive circuit 57 includes a voltage divider 71, a low-pass filter 72 and a current-voltage converter 73.

The voltage divider 71 has a plurality of resistance elements, and controls the junctions of the resistance elements under a signal from the microcomputer 55 so as to obtain a desired fraction of the voltage supplied from the power supply circuit 53 and output the thus-obtained voltage to the low-pass filter 72. The output voltage has a substantially staircase sinusoidal waveform in the first embodiment.

The low-pass filter 72 removes low frequency components from the output voltage of the voltage divider 71 to thereby convert the output voltage into a smooth sinusoidal waveform, and outputs the converted voltage to the switching circuit 59.

It is noted that the voltage divider 71 and the low-pass filter 72 may employ such conventional configurations as disclosed in Japanese Laid-Open Patent Publication No. 2003-110364.

The current-voltage converter 73 converts current signals from the electrodes 13 and 17 into voltage signals, and then, outputs the voltage signals to the microcomputer 55.

The switching circuit 59 has an analog switch to switch the connection of the signal transmit/receive circuit 57 to either the sensor electrodes 13 or the reference electrodes 17 in response to a switch control signal from the microcomputer 55.

To sum up, the signal transmit/receive circuit 57 transmits the sinusoidal signal (as a measurement signal) to either the sensor electrodes 13 or the reference electrodes 17 via the switching circuit 59, and receives the sinusoidal signal that has passed through and returned from the electrodes 13 or 15 via the switching circuit 59. The waveform of the measurement signal becomes changed according to the electrode capacitance when the measurement signal passes through the sensor electrodes 13 or the reference electrodes 17. Accordingly, the electrode capacitance can be measured from the measurement signal that has passed through the electrodes 13 or 17.

The grounding circuit 61 has two switching elements, such as transistors, 62 to switch a current path from the sensor electrodes 13 to the ground line (hereinafter referred to as a "sensor electrode current bypass line") into either a current-carrying state or an open state in response to a shield control signal from the microcomputer 55.

Figure 5:
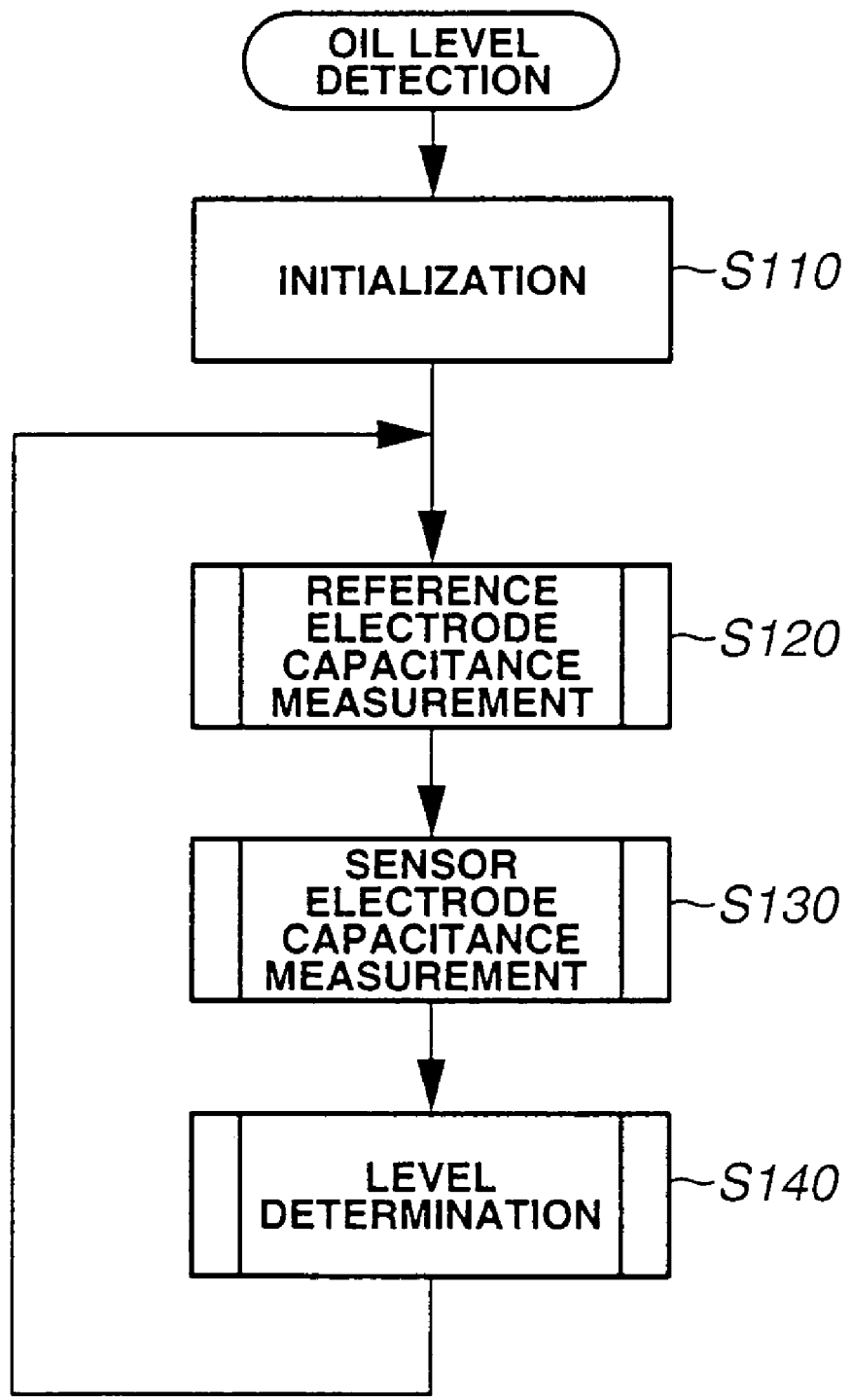
FIG. 5 is a flowchart of liquid level detection of the liquid level detection apparatus according to the first embodiment of the present invention.

Next, the oil level detection process of the oil level detection apparatus 1 will be explained below in more detail. The microcomputer 55 runs an oil level detection program in the following steps S110 to S140 as shown in FIG. 5.

The microcomputer 55 first initializes the RAM 65, the I/O port 66 and the timer register in step S110.

Figure 6:
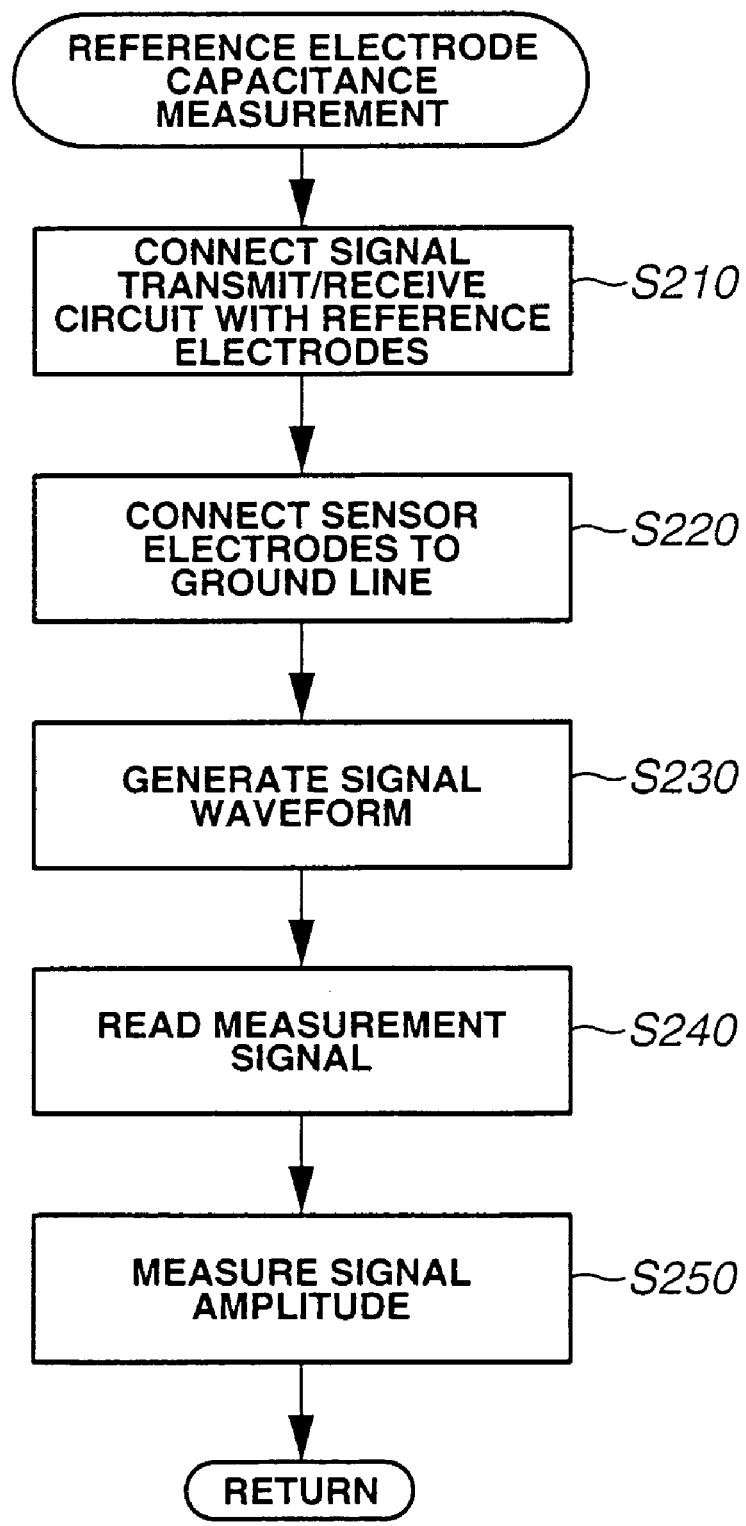
FIG. 6 is a flowchart of reference value measurement of the liquid level detection apparatus according to the first embodiment of the present invention.

In step S120, the microcomputer 55 performs a reference electrode capacitance measurement subroutine. As shown in FIG. 6, the reference electrode capacitance measurement subroutine goes through the following steps S210 to S250.

In step S210, the microcomputer 55 outputs to the switching circuit 59 a switch control signal to operate the analog switch and thereby change the connection of the signal transmit/receive circuit 57 to the reference electrodes 17.

In step S220, the microcomputer 55 generates to the grounding circuit 61 a shield control signal to switch the sensor electrode current bypass line into the ON state (i.e. the current-carrying state) upon energization of the grounding circuit 61 and thereby connect the sensor electrodes 13 to the ground line. This allows the sensor electrodes 13 to also function as ground electrodes so as to avoid the occurrence of a capacitance between the electrode leads 19 and prevent the superimposing of such a stray capacitance onto the reference electrode capacitance.

In step S230, the microcomputer 55 generates to the signal transmit/receive circuit 57 an input waveform generation signal to cause the voltage divider 71 to output a staircase sinusoidal measurement signal to the low-pass filter 72. Then, the measurement signal is filtered by the low-pass filter 72 and sent to the reference electrodes 17 via the switching circuit 59.

In step S240, the microcomputer 55 receives the measurement signal returned from the reference electrodes 17 (hereinafter referred to as a "reference electrode capacitance measurement signal") via the current-voltage converter 73.

In step S250, the microcomputer 55 reads the maximum amplitude of the reference electrode capacitance measurement signal proportional to the reference electrode capacitance. As the reference electrode capacitance varies only with the oil permittivity, the maximum amplitude of the reference electrode capacitance measurement signal corresponds to the oil permittivity. After the completion of step S205, the process proceeds to step S130.

Figure 7:
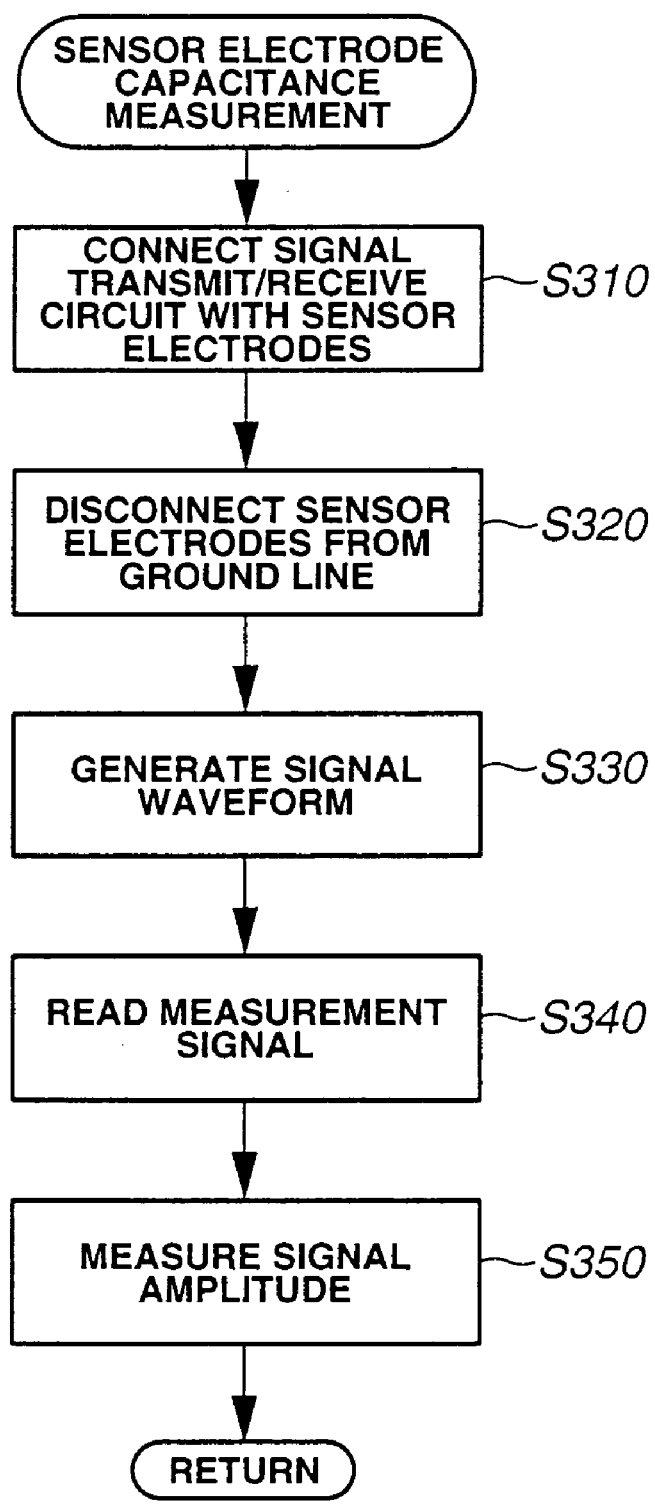
FIG. 7 is a flowchart of sensor value measurement of the liquid level detection apparatus according to the first embodiment of the present invention.

In step S130, the microcomputer 55 performs a sensor electrode capacitance measurement subroutine. The sensor electrode capacitance measurement subroutine goes through the following steps S310 to S350 as shown in FIG. 7.

In step S310, the microcomputer 55 outputs to the switching circuit 59 a switch control signal to operate the analog switch and thereby change the connection of the signal transmit/receive circuit 57 to the sensor electrodes 13. Upon connection of the signal transmit/receive circuit 57 to the sensor electrodes 13, the reference electrodes 17 are disconnected from the external device and brought into an unpowered state.

In step S320, the microcomputer 55 generates to the grounding circuit 61 a shield control signal to switch the sensor electrode current bypass line into the OFF state (i.e. the open state) upon de-energization of the grounding circuit 61 and thereby insulate the sensor electrodes 13 from the ground line by interruption of the sensor electrode current bypass line.

In step S330, the microcomputer 55 generates to the signal transmit/receive circuit 57 an input waveform generation signal to cause the voltage divider 71 to transmit a staircase sinusoidal measurement signal to the low-pass filter 72. Then, the measurement signal is filtered by the low-pass filter 72 and sent to the sensor electrodes 13 via the switching circuit 59.

In step S340, the microcomputer 55 receives the measurement signal returned from the sensor electrodes 13 (hereinafter referred to as a "sensor electrode capacitance measurement signal") via the current-voltage converter 73.

In step S350, the microcomputer 55 reads the maximum amplitude of the sensor electrode capacitance measurement signal proportional to the sensor electrode capacitance. As the sensor electrode capacitance varies with the sensor electrode immersion rate, the maximum amplitude of the sensor electrode capacitance measurement signal corresponds to the sensor electrode immersion rate i.e. the oil level. After the completion of step S350, the process proceeds to step S140.

Figure 8:
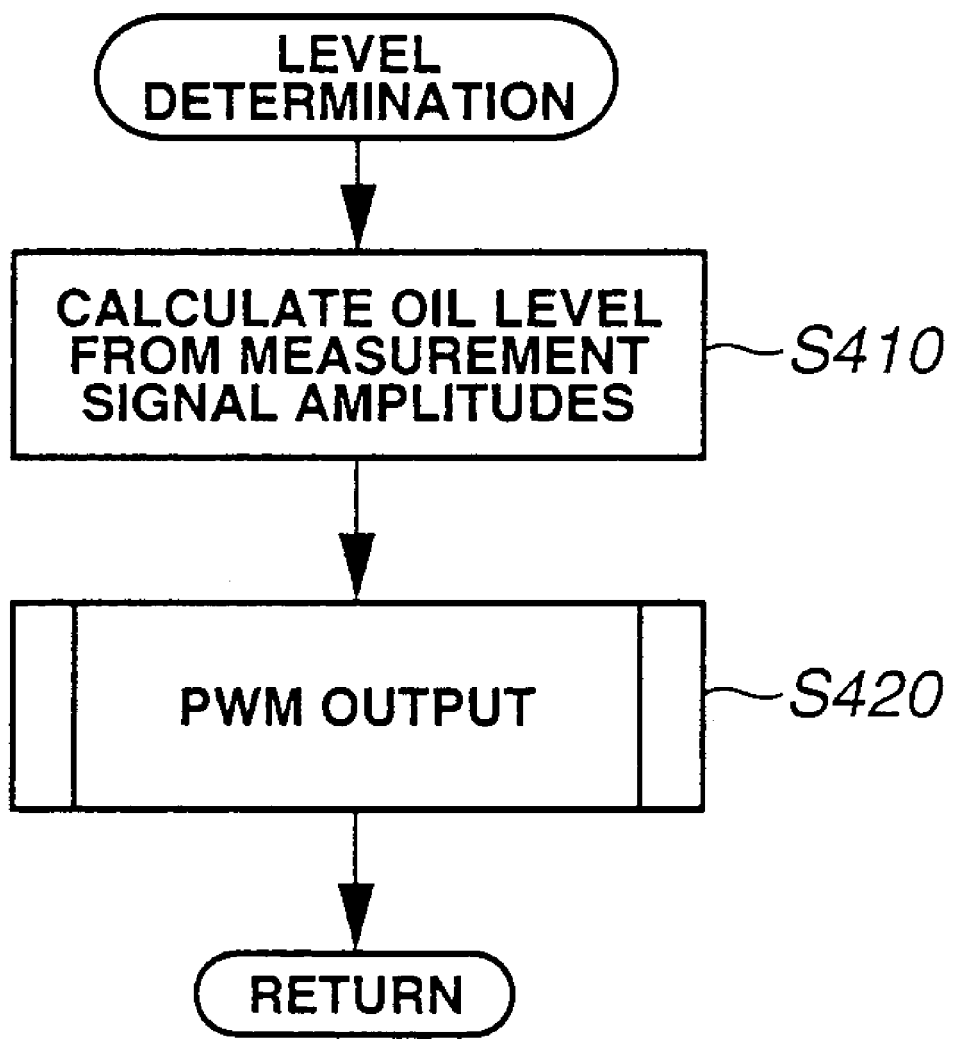
FIG. 8 is a flowchart of liquid level determination of the liquid level detection apparatus according to the first embodiment of the present invention.

In step S140, the microcomputer 55 determines the oil level through the following subroutine steps S410 and S420 as shown in FIG. 8.

In step S410, the microcomputer 55 calculates the reference and sensor electrode capacitances from the maximum amplitudes of the reference and sensor electrode capacitance measurement signals, respectively, and determines the oil level based on both the reference electrode capacitance and the sensor electrode capacitance.

In the first embodiment, the electrode capacitance is proportional to the electrode length. The capacitance per unit length of the immersed parts of the reference electrodes 17 is thus given by dividing the overall capacitance of the reference electrodes 17 by the length of the reference electrodes 17 as follows:

$$Cro = \frac{Cr}{Lr} \qquad (1)$$

where Cr is the overall capacitance of the reference electrodes 17; Cro is the capacitance per unit length of the reference electrodes 17; and Lr is the length of the reference electrodes 17.

Further, the overall capacitance of the sensor electrodes 13 is given as the sum of a capacitance of the immersed parts of the sensor electrodes 13 and a capacitance of the non-immersed parts of the sensor electrodes 13:

$$Cs=(Cso \times Lso)+(Csa \times Lsa) \qquad (2)$$

where Cs is the overall capacitance of the sensor electrodes 13; Cso is the capacitance per unit length of the immersed parts of the sensor electrodes 13; Lso is the length of the immersed parts of the sensor electrodes 13; Csa is the capacitance per unit length of the non-immersed parts of the sensor electrodes 13; and the Lsa is the length of the non-immersed parts of the sensor electrodes 13.

The following equation holds for the length of the sensor electrodes 13:

$$Lsa = Ls - Lso \qquad (3)$$

where Ls is the total length of the sensor electrodes 13.

It is herein assumed that the capacitance per unit length of the immersed parts of the sensor electrodes 13 equal to the capacitance per unit length of the reference electrodes 17 in the first embodiment:

$$Cso = Cro \qquad (4).$$

The capacitance per unit length of the non-immersed parts of the sensor electrodes 13 can be taken as a fixed value (previously defined by experimental measurement). Based on these assumptions, the length of the immersed parts of the sensor electrodes 13 can be measured as a function of two variables: the reference electrode capacitance and the sensor electrode capacitance by means of the simultaneous equations (1) to (4). Accordingly, the oil level (corresponding to the length of the immersed parts of the sensor electrodes 13) is determined by detecting the maximum amplitudes of the reference and sensor electrodes capacitance measurement signals, and then, substituting the detection results into a predefined computing expression.

Figure 9:
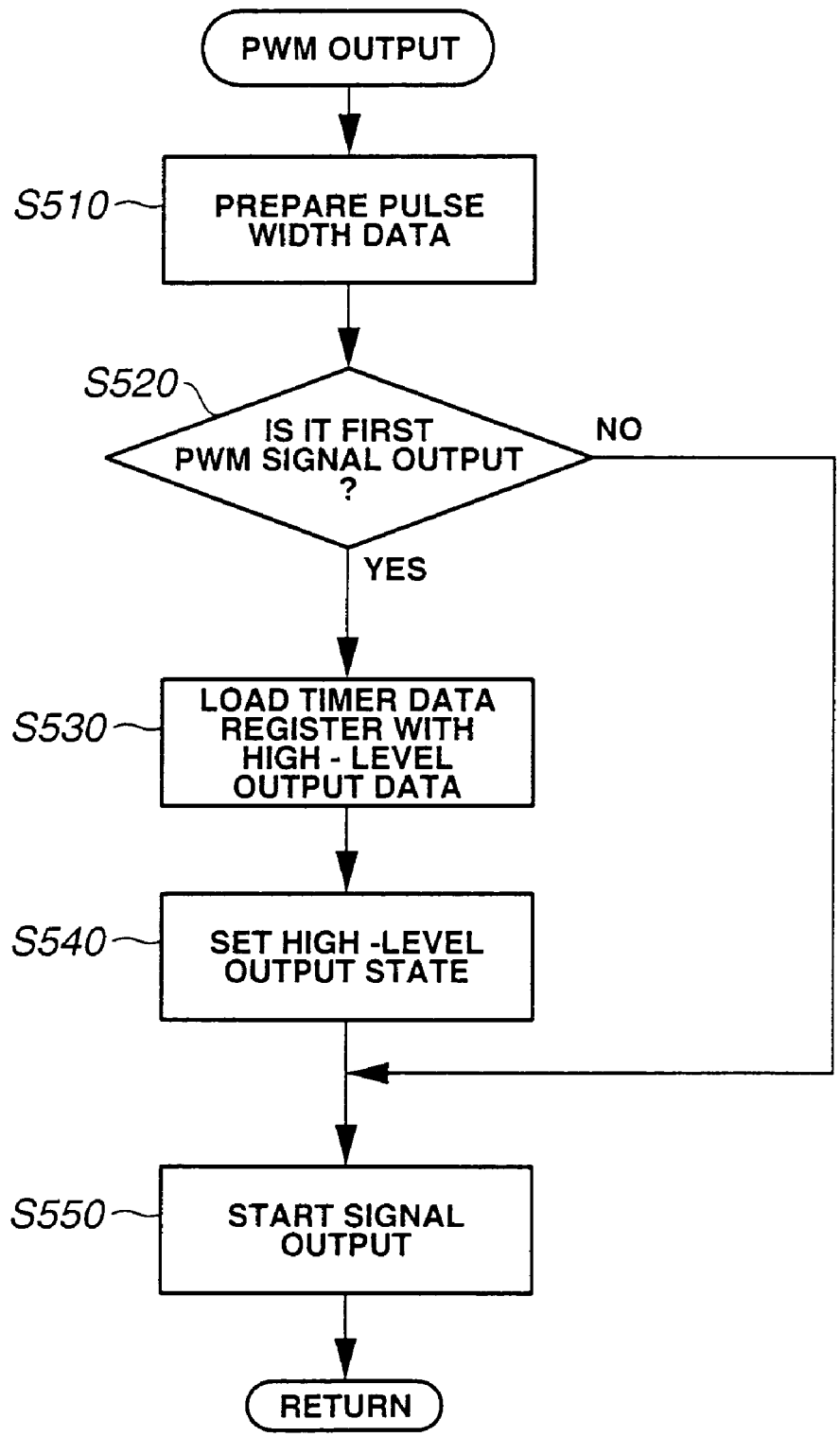
FIG. 9 is a flowchart of PWM (pulse-width modulation) output control of the liquid level detection apparatus according to the first embodiment of the present invention.

In step S420, the microcomputer 55 conducts a PWM output processing. The PWM output processing goes through the following subroutine steps S510 to S550 as shown in FIG. 9.

In step S510, the microcomputer 55 prepares pulse width data according to the determined oil level. The pulse width data combines at least high- and low-level output data containing information about the high- and low-level output times of a PWM signal, respectively, and is set in such a manner that the high-level output time increases with the oil level.

In step S520, the microcomputer 55 judges whether it is the first output of PWM signal. If Yes in step S520, the process proceeds to step S530. If No in step S520, the PWM output processing is terminated.

In step S530, the microcomputer 55 loads the timer data register with the prepared high-level output data.

In step S540, the microcomputer 55 changes the output state of the PWM signal into a high-level output state according to the high-level output data.

In step S550, the microcomputer 55 starts outputting the PWM signal.

Herein, the microcomputer 55 goes backs to the oil level determination when the PWM output processing is terminated by the negative judgment in step S520 or when the PWM output processing is completed after the end of step S550.

Figure 10:
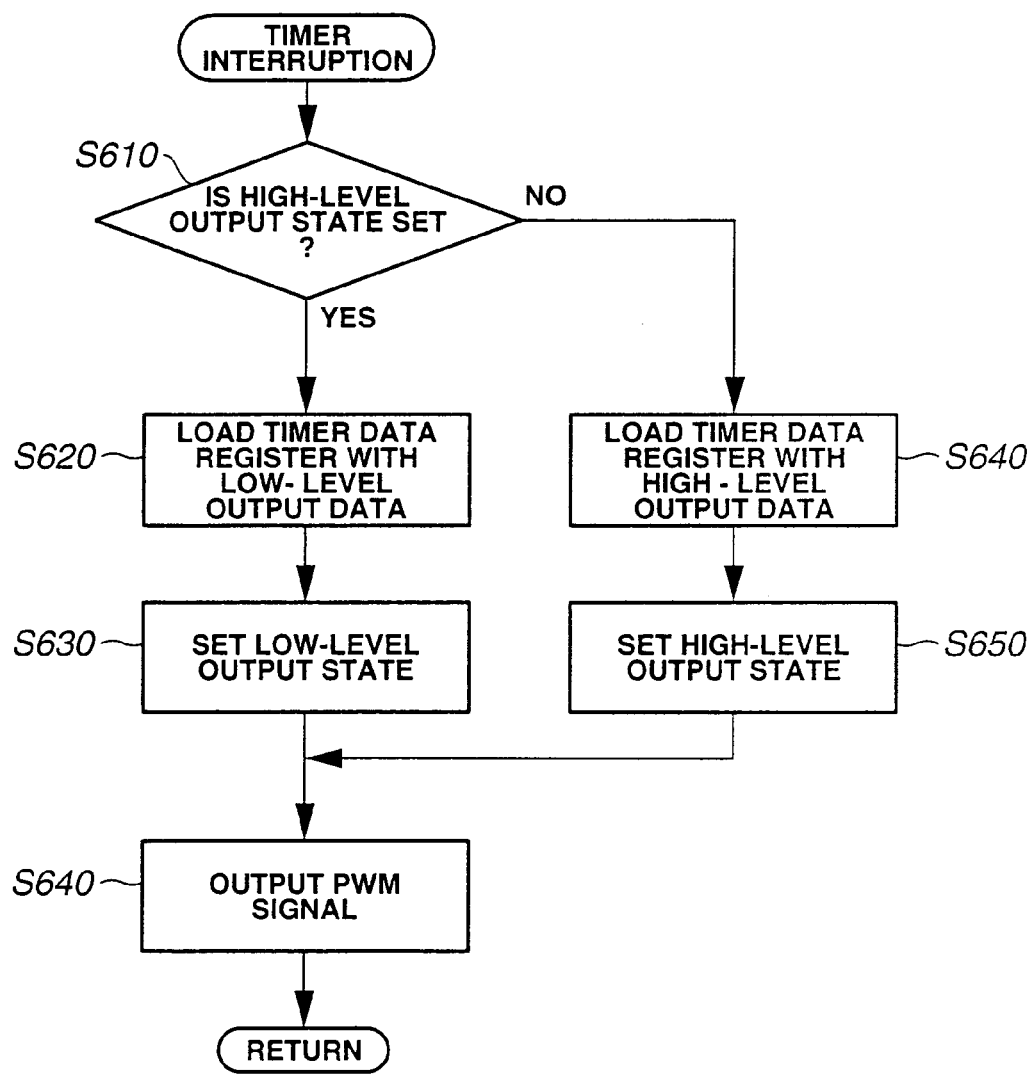
FIG. 10 is a flowchart of timer interruption of the liquid level detection apparatus according to the first embodiment of the invention.

Upon starting the output of the PWM signal in step S550, the microcomputer 55 measures a lapsed time using the timer. At the time when the high-level output time has elapsed since the PWM signal output was started, the microcomputer 55 causes timer interruption processing in the following subroutine steps S610 to S660 as shown in FIG. 10, so as to switch the output state of the PWM signal in accordance with the prepared pulse width data.

In step S610, the microcomputer 55 judges whether or not the output state of the PWM signal is in the high-level output state. If Yes in step S610, the process proceeds to step S620. If No in step S610, the process proceeds to step S640.

In step S620, the microcomputer 55 loads the timer data register with the low-level output data.

The microcomputer 55 changes the output state of the PWM signal into a low-level output state according to the low-level output data in step S630. The process then proceeds to step S660.

In step S640, the microcomputer 55 loads the timer data register with the high-level output data.

The microcomputer 55 changes the output state of the PWM signal into the high-level output state according to the high-level output data in step S650. Then, the process proceeds to step S660.

In step S660, the microcomputer 55 starts outputting the PWM signal, so that the oil level detection apparatus 1 informs the oil level of the ECU 5 by means of the PWM signal.

After the completion of the oil level determination and the PWM output processing, the microcomputer 55 starts the oil level detection process again to detect the oil level and output the detection result to the ECU 5 repeatedly through steps S120 to S140.

As described above, the oil level detection apparatus 1 operates the grounding circuit 61 under energization control so as to switch the sensor electrode current bypass line into a current-carrying state and thereby connect the sensor electrodes 13 to the ground line at the time of measurement of the reference electrode capacitance. There is no need to provide a ground electrode or electrodes sandwiched between the electrode leads 19 and connected in advance to the ground line. By measuring the reference electrode capacitance with the sensor electrodes 13 connected to the ground line so as to function as ground electrodes, it becomes possible to prevent the occurrence of a stray capacitance between the electrode leads 19 during the reference electrode capacitance measurement, which can result in consequences adverse to detection accuracy of the oil level detection apparatus 1. It becomes also possible to avoid an increase in electrode arrangement area and achieve the downsizing of the sensor body 11 without the usages of the oil level detection apparatus 1 being restricted owing to the limited sensor installation space.

At the time of measurement of the sensor electrode capacitance, the oil level detection apparatus 1 actuates the grounding circuit 61 so as to switch the sensor electrode current bypass line into an open state and thereby insulate the sensor electrodes 13 from the ground line. By measuring the sensor electrode capacitance with the sensor electrodes 13 insulated from the ground line and with the reference electrodes 17 held in an unpowered state, it becomes possible to measure not only the reference electrode capacitance but also the sensor electrode capacitance with a higher degree of accuracy and thereby improve oil level detection accuracy.

To mount the oil level sensor 2 onto the oil tank, the oil level sensor 2 is inserted into the oil tank from the tank top side to the tank bottom side. The reference electrodes 17 are located on the vertically lower side of the sensor electrodes 13, and the electrode leads 15 and 19 extend toward the vertically upper side so that the connection terminals 16 and 20 are formed at the vertically upper end of the electrode arrangement area of the sensor body 11. As the sensor insertion hole is not formed in the bottom of the oil tank, it is possible to prevent oil leaks from the sensor insertion hole. The oil level sensor 2 is effective for use in the oil tank where the sensor insertion hole cannot be formed in the bottom of the oil tank.

The oil level detection apparatus 1 has a single signal transmit/receive circuit 57 used to measure both of the capacitances of the sensor and reference electrodes 13 and 17 since the connection of the signal transmit/receive circuit 57 is switched to either the sensor electrodes 13 or the reference electrodes 17 by means of the switching circuit 59. If separate signal transmit/receive circuits are provided to measure the sensor and reference electrode capacitances, respectively, unavoidable detection errors will occur due to an individual difference between the signal transmit/receive circuits. By the use of a single signal transmit/receive circuit 57, however, it becomes possible to prevent the occurrence of such detection errors assuredly and maintain the detection accuracy of the oil level detection apparatus 1. Namely, the microcomputer 55 acts not only as an oil level determination unit but also as sensor and reference electrode capacitance measurement units at the execution of the sensor and reference electrode capacitance measurement subroutines, respectively, in combination with the signal transmit/receive circuit 57 and the switching circuit 59.

In addition, the formation of the electrodes 13 and 17 and the electrode leads 15 and 19 on the insulating film support 29 allows these sensor elements 13, 15, 17 and 19 to be positioned all at once upon immersion of the film support 29 into the test oil liquid without time and trouble to position the sensor elements 13, 15, 17 and 19 separately. Herein, the electrodes 13 and 17 and the electrode leads 15 and 19 can be easily arranged in the same plane by forming the electrodes 13 and 17 and the electrode leads 15 and 19 of e.g. metal foil.

Figure 11:
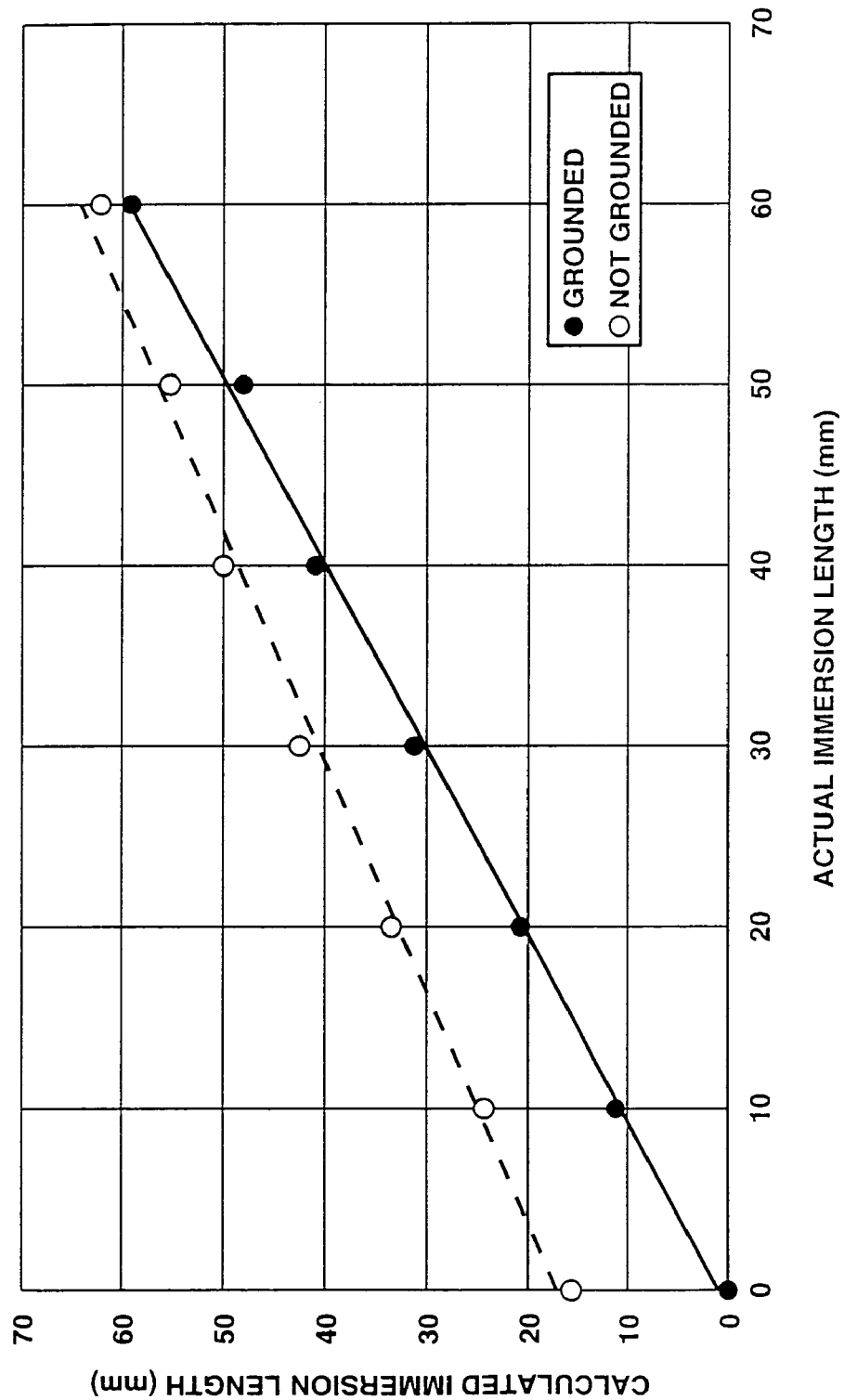
FIG. 11 is a graph showing the degree of detection accuracy of the liquid level detection apparatus according to the first embodiment of the invention.
Figure 12:
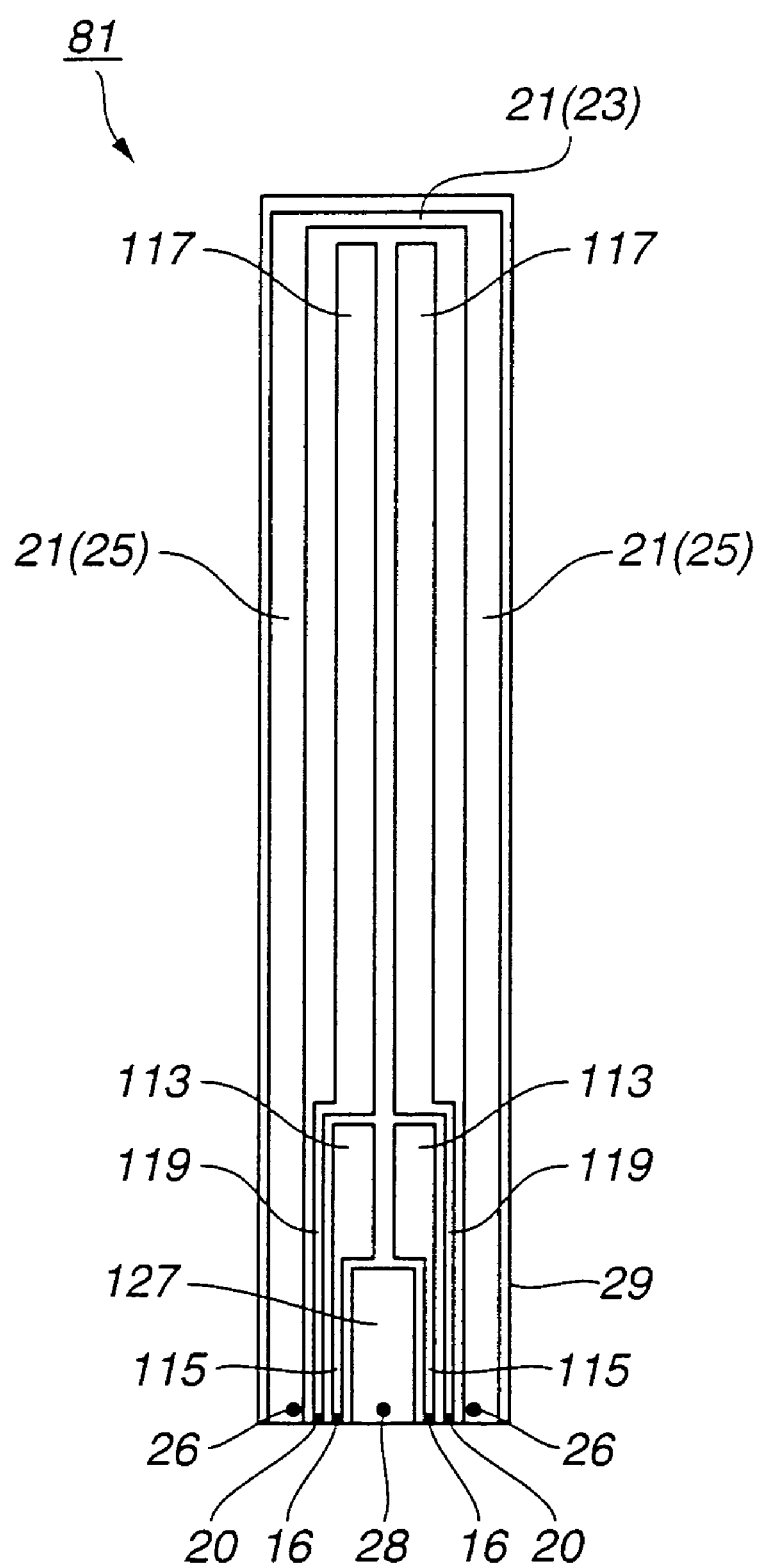
FIG. 12 is an arrangement view of sensor elements in a liquid level sensor according to a modification of the first embodiment of the invention.

The above-mentioned oil level detection apparatus 1 was examined on its oil level detection accuracy. In the examination, the oil level detection apparatus 1 was used to detect the oil level with and without the sensor electrodes 13 being connected to the ground line during the reference electrode capacitance measurement. In the case of not connecting the sensor electrodes 13 to the ground line during the reference electrode capacitance measurement, the path of the shield control signal from the microcomputer 55 to the grounding circuit 61 was forcefully cut off. The examination results are shown in FIG. 11. The horizontal and vertical axes of FIG. 11 represent actual and calculated lengths (mm) of the immersed parts of the sensor electrodes 13, respectively.

As shown in FIG. 11, the detection values are in well agreement with the actual values with the sensor electrodes 13 being grounded during the reference electrode capacitance measurement. On the other hand, the detection values deviate from the actual value without the sensor electrodes 13 being grounded during the reference electrode capacitance measurement. It is thus concluded that the oil level detection apparatus 1 is able to prevent the occurrence of a capacitance between the electrode leads 19 effectively during the reference electrode capacitance measurement upon connection of the sensor electrodes 13 to the ground line so as to attain improved oil level detection accuracy, although the capacitance between the electrode leads 19 causes as a stray capacitance adverse effects on the detection results without the sensor electrodes 13 connected to the ground line.

Next, the second embodiment will be explained with reference to FIG. 13. An oil level detection apparatus 100 of the second embodiment is structurally similar to the oil level detection apparatus 1 of the first embodiment, except that the oil level detection apparatus 100 has an additional grounding circuit (unit) 161.

Figure 13:
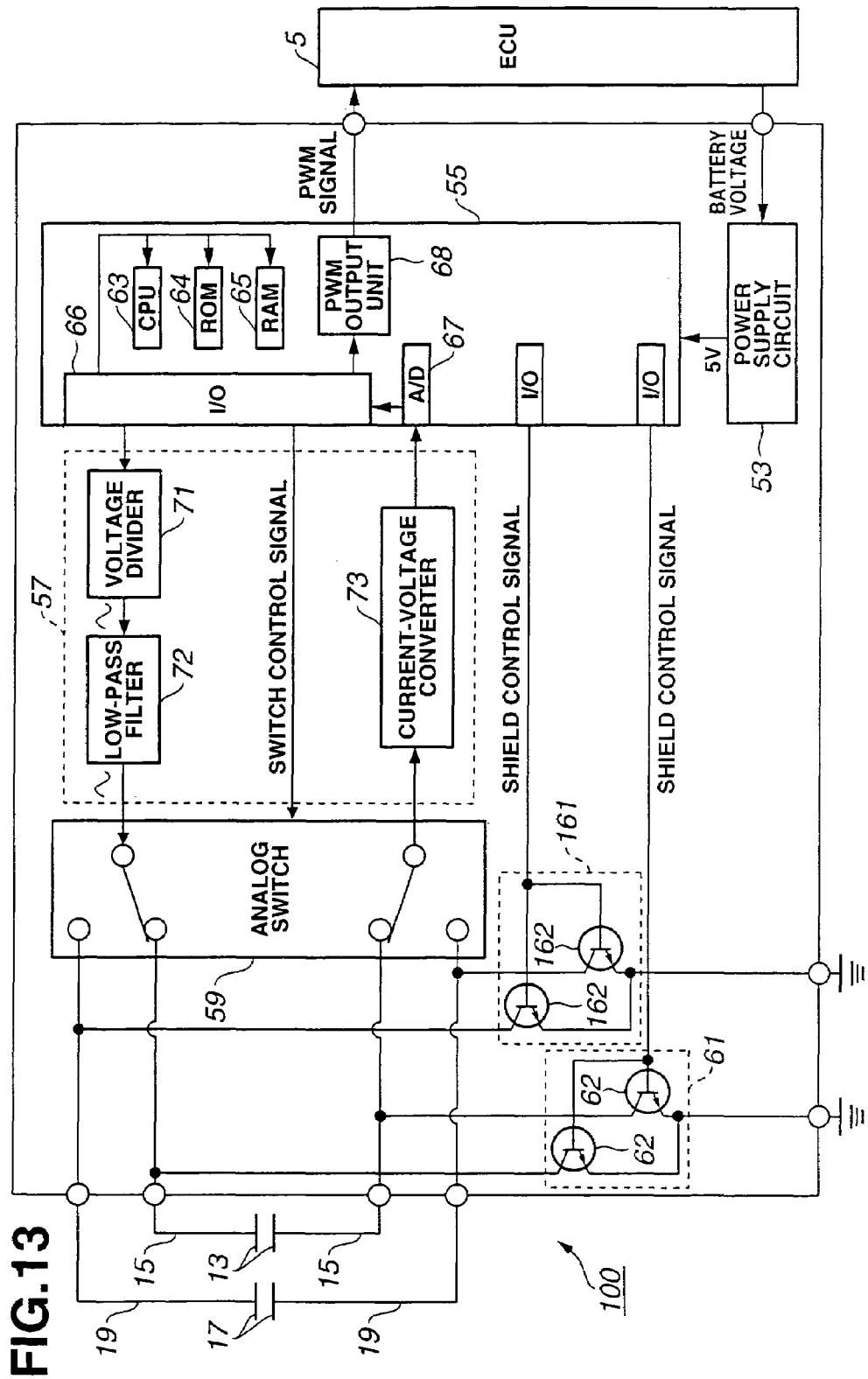
FIG. 13 is a block diagram of a liquid level detection apparatus according to a second embodiment of the invention.

As shown in FIG. 13, the grounding circuit 161 has two switching elements, such as transistors, 162 to switch a current path from the reference electrodes 17 to the ground line via the electrode leads 19 (hereinafter referred to as a "reference electrode current bypass line") into either a current-carrying state or an open state in response to a shield control signal from the microcomputer 55.

In the first embodiment, the oil level detection apparatus 1 controls the grounding circuit 61 so as to switch the sensor electrode current bypass line into the current-carrying state and thereby connect the sensor electrodes 13 to the ground line at the time of measurement of the reference electrode capacitance, and then, controls the grounding circuit 61 so as to switch the sensor electrode current bypass line into the open state and thereby insulate the sensor electrodes 13 from the ground line at the time of measurement of the sensor electrode capacitance.

In the second embodiment, the oil level detection apparatus 100 not only controls the grounding circuit 61 so as to insulate the sensor electrodes 13 from the ground line but also controls the grounding circuit 161 so as to switch the reference electrode current bypass line into the current-carrying state and thereby connect the reference electrodes 17 to the ground line at the time of measurement of the sensor electrode capacitance. At the time of measurement of the reference electrode capacity, the oil level detection apparatus 100 not only controls the grounding circuit 61 so as to connect the sensor electrodes 13 to the ground line but also controls the grounding circuit 161 so as to switch the reference electrode current bypass line into the open state and thereby insulate the reference electrodes 17 from the ground line in the second embodiment. By measuring the sensor electrode capacitance with the reference electrodes 19 connected to the ground line via the electrode leads 19 so as to function as ground electrodes, it becomes possible to measure the sensor electrode capacitance more accurately and attain further improved oil level detection accuracy.

In the oil level detection process of the second embodiment, the microcomputer 55 is configured to further generate to the grounding circuit 161 a shield control signal to switch the reference electrode current bypass line into the OFF state (open state) between steps S220 and S230 for the measurement of the reference electrode capacitance, and then, generate to the grounding circuit 161 a shield control signal to switch the reference electrode current bypass line into the ON state (current-carrying state) between steps S320 and S330 for the measurement of the sensor electrode capacitance.

The entire contents of Japanese Patent Application No. 2003-434195 (filed on Dec. 26, 2003) are herein incorporated by reference.

Although the present invention has been described with reference to specific embodiments of the invention, the invention is not limited to the above-described embodiments. Various modification and variation of the embodiments described above will occur to those skilled in the art in light of the above teaching.

For example, the oil level sensor 2 may alternatively be designed to be inserted into and mounted onto the oil tank from the vertically lower side (tank bottom side) to the vertically upper side (tank top side). In this case, the oil level senor 2 includes a sensor body 81 as shown in FIG. 2 and a casing (not shown) installing therein the sensor body 81 and being shaped insertably into the tank from the tank bottom side to the tank top side. The sensor body 81 has a pair of sensor electrodes 117 (as first electrodes), a pair of reference electrodes 113 (as second electrodes), a ground electrode 127 and electrode leads 115 and 119 supported on the insulating film 29. The reference electrodes 117 are located on the rear (vertically lower) side of the sensor electrodes 113. The electrode leads 15 extend from the respective rear ends of the reference electrodes 113 toward the rear end of the film 29. The electrode leads 119 extend from the respective rear ends of the sensor electrodes 117 toward the rear end of the film 29 so as to sandwich therebetween the reference electrodes 113. The ground electrode 127 is arranged on the rear side of the reference electrodes 113 between the electrode leads 15. The terminals 16 and 20 of the electrode leads 115 and 119, the terminal 28 of the ground electrode 127 and the terminals 26 of the reinforcement 21 are formed at the rear end (vertically lower end) of the electrode arrangement area of the sensor body 81. For use of the oil level sensor 2 with the sensor body 81, the oil level detection process is modified in such a manner as to measure the capacitance between the sensor electrodes 117 with the reference electrodes 113 connected to the ground line and to measure the capacitance between the reference electrodes 113 with the reference electrodes 113 kept insulated from the ground line and with the sensor electrodes 117 brought in the unpowered state (or connected to the ground line). With such a configuration, the occurrence of a stray capacitance between the electrode leads 19 during the measurement of the sensor electrode capacitance can be also prevented assuredly without an increase in electrode arrangement area. Further, there is no need to secure a large length between the reference electrodes 113 and the terminals for connection with the circuit module 51 so as to immerse the whole of the reference electrodes 113 into the oil assuredly while avoiding the upsizing of the sensor body 81 and the oil level sensor 2. The oil level sensor 2 with the sensor body 81 can be thus used to detect the oil level, without a deterioration in detection accuracy, even in a limited sensor installation space.

The electrodes 13, 17, 113 and 117 are not limited to the above linear shape. An opposed pair of comb-shaped electrodes or an opposed pair of a U-shaped electrode and a linear electrode may be used to form an electrical condenser.

The grounding circuit 61 or 161 may alternatively have any switching elements other than the transistors, such as mechanical switches, that are capable of switching the current bypass line into the current-carrying state or the open state.

The present invention can be applied to any other liquid level detection apparatus that detects the level of a liquid different in permittivity from air, e.g. gasoline or water, without being limited to the above oil level detection apparatuses 1 and 100.

The scope of the invention is defined with reference to the following claims.

What is claimed is:

1. An apparatus for detecting the level of a liquid, comprising:
   a pair of first electrodes at least partly immersed in the liquid;
   a pair of second electrodes arranged at a different height to that of the first electrodes and at least partly immersed in the liquid;
   a pair of electrode leads having respective ends connected with the first electrodes and sandwiching therebetween the second electrodes;
   a grounding unit that changes, between a current-carrying state and an open state, a second electrode current bypass from the second electrodes to a ground line;
   a first electrode capacitance measurement unit that measures a first electrode capacitance between the first electrodes, with the second electrode current bypass set in the current-carrying state to establish a connection from the second electrodes to the ground line; and
   a level determination unit that determines the liquid level based on the first electrode capacitance between the first electrodes and a second electrode capacitance between the second electrodes.

2. The apparatus as set forth in claim 1, further comprising a second electrode capacitance measurement unit that measures the second electrode capacitance, with the second electrode current bypass set in the open state to insulate the second electrodes from the ground line and with the first electrodes set in an unpowered state.

3. The apparatus as set forth in claim 1, further comprising:
   a second ground unit that changes a first electrode current bypass from the first electrodes to the ground line between a current-carrying state and an open state; and
   a second electrode capacitance measurement unit that measures the second electrode capacitance, with the second electrode current bypass set in the open state to insulate the second electrodes from the ground line and with the first electrode current bypass set in the current-carrying state to establish a connection from the first electrodes to the ground line.

4. The apparatus as set forth in claim 1, further comprising an insulating support that supports the first electrodes, the second electrodes and the electrode leads in the same plane.

5. The apparatus as set forth in claim 1, the first electrodes being arranged at a vertically lower side of the second electrodes and totally kept immersed in the liquid so as to function as reference electrodes, and the second electrodes being vertically elongated and having a rate of immersion into the liquid varied according to the liquid level so as to function as sensor electrodes.

6. The apparatus as set forth in claim 1, the second electrodes being arranged at a vertically lower side of the first electrodes and totally kept immersed in the liquid so as to function as reference electrodes, and the first electrodes being vertically elongated and having a rate of immersion into the liquid varied according to the liquid level so as to function as sensor electrodes.

7. The apparatus as set forth in claim 2, further comprising:
   a signal transmit/receive unit that transmits a measurement signal to either of the first and second electrodes and receives the measurement signal that has passed through said either of the first and second electrodes; and
   a switching circuit that switches the connection of the signal transmit/receive unit to either the first electrodes or the second electrodes,
   the first electrode capacitance measurement unit controlling the switching unit so as to connect the signal transmit/receive unit with the first electrodes and thereby measuring the first electrode capacitance from the measurement signal that has passed through the first electrodes, and
   the second electrode capacitance measurement unit controlling the switching unit so as to connect the signal transmit/receive unit with the second electrodes and thereby measuring the second electrode capacitance from the measurement signal that has passed through the second electrodes.

8. An apparatus for detecting the level of a liquid in a container, comprising:
a sensor mounted onto the container, the sensor including a pair of first electrodes immersed in the liquid to develop a first electrode capacitance, a pair of second electrodes vertically aligned to the first electrodes and immersed in the liquid to develop a second electrode capacitance, a pair of first electrode leads connected with the respective first electrodes and sandwiching therebetween the second electrodes and a pair of second electrode leads connected with the respective second electrode leads; and
a detection circuit module electrically connected with the first and second electrodes through the electrode leads, the circuit module including a grounding circuit for establishing and breaking a connection from the second electrodes to a ground line and a microcomputer configured to control the grounding circuit so as to connect the second electrodes with the ground line at the time of measurement of the first electrode capacitance, control the grounding circuit so as to insulate the second electrodes from the ground line at the time of measurement of the second electrode capacitance and determine the liquid level based on the first and second electrode capacitances.

9. The apparatus as set forth in claim 8,
the circuit module including a second grounding circuit for establishing and breaking a connection from the first electrodes to the ground line, and
the microcomputer being further configured to control the second grounding circuit to connect the first electrodes with the ground line at the time of measurement of the second electrode capacitance and control the second grounding circuit so as to insulate the first electrodes from the ground line at the time of measurement of the first electrode capacitance.

10. The apparatus as set forth in claim 8, the circuit module including:
a signal transmit/receive circuit for transmitting a measurement signal to either the first electrodes or the second electrodes and receiving the measurement signal that has passed through said either the first electrodes or the second electrodes; and
a switching circuit for connecting the signal transmit/receive circuit with either the first electrodes or the second electrodes,
the microcomputer being further configured to control the switching circuit to connect the signal transmit/receive circuit with the first electrodes and thereby measure the first electrode capacitance from the measurement signal that has passed through the first electrodes, and control the switching circuit to connect the signal transmit/receive circuit with the second electrodes and thereby measure the second electrode capacitance from the measurement signal that has passed through the second electrodes.

11. The apparatus as set forth in claim 8, the sensor further including an insulating support that supports the first and second reference electrodes and the first and second electrode leads in the same plane.

12. The apparatus as set forth in claim 11, the sensor further including a reinforcement embedded in the insulating support so as to sandwich therebetween the electrodes and the electrode leads, the reinforcement having a terminal connected to the ground line.

13. The apparatus as set forth in claim 8, the first electrodes being located on a vertically lower side of the second electrodes and totally kept immersed in the liquid, and the second electrodes being vertically elongated to have a rate of immersion into the liquid varied according to the liquid level.

14. The apparatus as set forth in claim 13, the sensor being inserted into the container from a vertically upper side to a vertically lower side.

15. The apparatus as set forth in claim 8, the second electrodes being located on a vertically lower side of the first electrodes and totally kept immersed in the liquid, and the first electrodes being vertically elongated to have a rate of immersion into the liquid varied according to the liquid level.

16. The apparatus as set forth in claim 15, the sensor being inserted into the container from a vertically lower side to a vertically upper side.

17. The apparatus as set forth in claim 8, the microcomputer being further configured to output a pulse-width modulated signal to inform an electronic control unit of the detected liquid level.

* * * * *